United States Patent Office 3,702,857
Patented Nov. 14, 1972

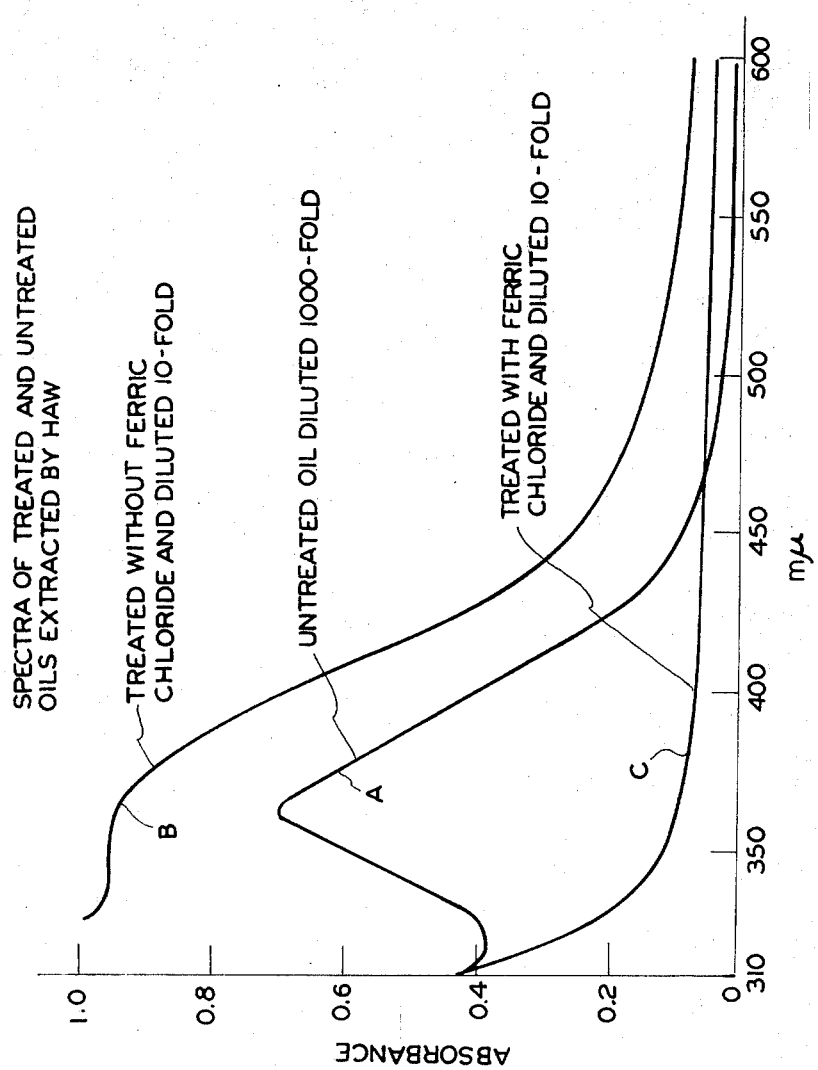

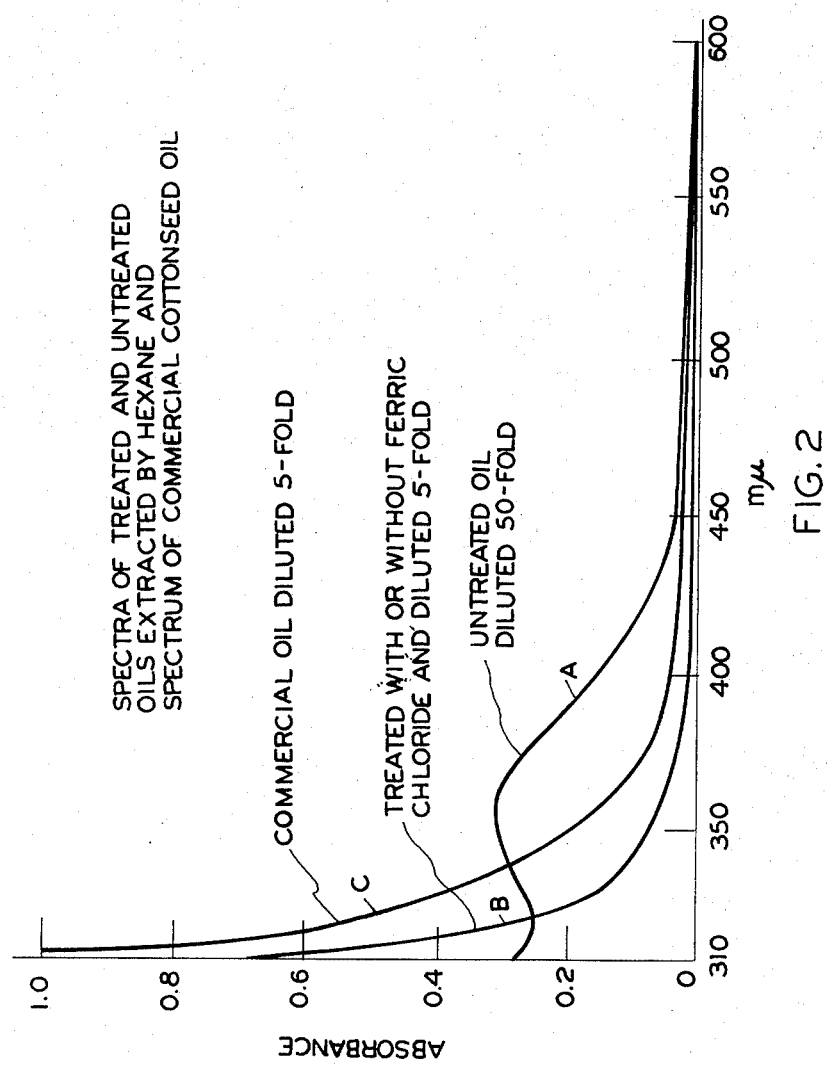

---

3,702,857
DECOLORIZATION OF COTTONSEED OIL WITH FERRIC CHLORIDE
Lawrence Y. Yatsu, New Orleans, Thomas J. Jacks, Metairie, and Thomas P. Hensarling, New Orleans, La., assignors to the United States of America as represented by the Secretary of Agriculture
Filed Mar. 10, 1970, Ser. No. 18,148
Int. Cl. C11b 3/06
U.S. Cl. 260—426                 2 Claims

ABSTRACT OF THE DISCLOSURE

Cottonseed miscella was treated with ferric chloride to form an iron-gossypol complex. The treated miscella was then extracted with alkaline water. The supernatant liquid filtered through bleaching clay produced an oil containing virtually no light-absorbing color bodies and a product that compared favorably, colorwise, with commercial oil.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for removing color bodies from vegetable oil. Specificlly, this invention relates to the removal of color bodies which are polyphenolic in nature from vegetable oils. More specifically, this invention relates to the removal of gossypol and its products from cottonseed miscella.

The primary object of the instant invention is to provide a process for removing the toxic and undesirable colored principles from cottonseed miscella in a more efficient and economical manner than currently employed.

A second object of this invention is to provide for a method which will enable the salvaging of cottonseed oil which is currently considered "fixed" with coloration and unsalvageable.

Another object of this invention is to provide for an easy method of cleaning miscella obtained from cottonseeds by newer methods of oil extraction which are now being developed primarily for obtaining high-grade cottonseed protein. These newer methods remove gossypol and aflatoxins from the cottonseed meal, but yield a much more highly pigmented miscellae. These highly pigmented miscella suffer from the strong potential of developing into uncleanable cottonseed oil which sell for much less than clean cottonseed oil.

Almost one quarter of the cottonseed oil produced in the United States is sold at less than premium prices because of pigment content that cannot be readily removed. Furthermore, a large quantity of imported oil also fails to realize its full economic potential because of pigment content. These losses are of such a serious nature that better methods of oil cleaning are constantly sought. Several methods have been developed to remove pigments, particularly gossypol, from cottonseed oil. Reaction of thse pigments employing various chemicals has been reported in the literature. S. T. Borsochev, et al. disclose a technique in U.S.S.R. Pat. No. 141,570 (as reported in Chemical Abstracts 56, 11735d, 1962) using anthranilic acid. P. L. N. Rao, et al. report the use of hydrogen peroxide in Indian Oilseed Journal 6, 180–4 (1962). Sodium silicate was used and disclosed by I. Meister, et al. in Hungarian Pat. No. 151,055 (as reported in Chemical Abstracts 60, 9492f, 1964). Walter A. Pons, Jr., et al. report in the Journal of the American Oil Chemical Society 38, 104–107 (1961) the adsorption of pigments on chromatographic material. W. S. Singleton, et al. reported similar work on related work in the same journal, 43, 592–595 (1966). A combination of the aforementioned methods was suggested by Pons, et al. in the same journal, 40, 10–13 (1963). Most of these methods utilize either a potentially toxic or hazardous chemical or constitute too limited a capacity for a commercially acceptable operation.

We have now discovered a method wherein color bodies or pigments of phenolic nature can be removed readily. By the method of the instant invention a divalent or a trivalent metallic cation is employed to remove color bodies, such as for instance gossypol, the principle pigment in cottonseed miscella, which by the instant method is precipitated with ferric chloride, thereby rendering the pigment removable. The method of the instant invention is not toxic, nor is it hazardous, and can be scaled up to commercial adaptation with a minimum of additional expense.

The detailed mechanism of oil decolorization with ferric chloride is uncertain but at least two steps are involved. These steps are (1) the formation of an iron-gossypol complex, and (2) manipulation of the complex for its removal. Details of the process or method of the instant invention are perhaps more elaborate in the article by L. Y. Yatsu, T. J. Jacks, and T. Hensarling scheduled to be published in 1970 in the Journal of the American Oil Chemists Society with the title "Use of Ferric Chloride to Decolorize Cottonseed Oil."

The first step occurs upon the simple addition of ferric chloride to the miscella. However, the mere passage of this treated miscella through natural earth does not remove the pigments, even when the miscella is washed with water.

Washing the treated miscella with an alkaline solution removes free fatty acids (Table I) and some pigmented material by partitioning and precipitation, but more important, this treatment enabled subsequent removal of pigmented material from the oil by passage through natural bleaching earth.

TABLE I.—ABSORBANCE AND FREE FATTY ACID CONTENT OF UNDILUTED OILS BEFORE AND AFTER TREATMENT AND OF COMMERCIAL COTTONSEED OIL

| Sample | Absorbance at 360 mμ | Relative absorbance | Free fatty acid, percent |
|---|---|---|---|
| HAW, untreated | 700.00 | 1,076.90 | 3.94 |
| HAW, treated without ferric chloride | 9.60 | 14.80 | |
| HAW, treated with ferric chloride | 1.00 | 1.54 | 0.07 |
| Hexane, untreated | 15.75 | 24.30 | 0.72 |
| Hexane, treated without ferric chloride | 0.28 | 0.43 | |
| Hexane, treated with ferric chloride | 0.28 | 0.43 | 0.61 |
| Commercial oil | 0.65 | 1.00 | 0.04 |

Although commercial application of this method might produce some problems, e.g., removal of natural antioxidants, much of the oil currently regarded as "color-fixed" might well be recovered by this method. In preliminary experiments, several "color-fixed" oils, even an oil that remained colored after commercial processing, were decolorized. Furthermore, since the commercial processing of oil involved treatment with alkali and clay already, perhaps addition of ferric ions to the miscella under present conditions will be sufficient for decolorization and reclamation of most of the cottonseed oil produced in the United States.

Spectrophotometric determinations were made with preferred recording spectrophotometers. Appropriate dilutions of the material to be analyzed were made in spectrograde hexane. Contents of free fatty acids were determined by titration according to the Official and Tentative Methods of the AOCS (1964 Rev.), except that the indicator Nile Blue was substituted for phenolphthalein to overcome the difficulty of observing red color changes in a reddish milieu.

FIG. 1 shows spectra obtained by hexane-acetone-water azeotrope extraction, and FIG. 2 shows spectra obtained by hexane extraction, before and after treatment of the oils. Absorbance occurring at 360 m$\mu$ (characteristic of gossypol) was virtually eliminated by the treatment with ferric chloride. Indeed, they were spectrophotometrically similar to commercial cottonseed oil (see FIG. 2) even though they were not steam deodorized, a process which also removes some pigments.

Data in Table I, calculated from FIGS. 1 and 2 with corrections for dilutions, show the relative amounts of color due to pigments in the oils absorbing at 360 m$\mu$. Oil from HAW miscella contained over 1000-times more color than commercial oil and over 40-times more than oil from hexane miscella, yet was decolorized with the ferric chloride method to a level comparable to commercial oil. Oils from the HAW were decolorized partially and from the hexane were decolorized completely, by the control procedure that had no ferric chloride present. The addition of 0.1 volume of acetone followed by the alkaline wash and clay filter was sufficient to remove some pigment from oil, in the case of the oil extracted by hexane—which oil had a relatively low content of pigment—the amount removed comprised all of the pigment (see FIG. 2). However, the presence of ferric chloride resulted in additional pigment removal, yielding an oil that was almost ten times cleaner than oil prepared without ferric chloride (see FIG. 1).

In summary the method of the instant invention can best be described as that of decolorizing vegetable oils by the sequence of steps comprising:

(a) dissolving the vegetable oil in a suitable solvent,
(b) determining the approximate amount of pigment in the vegetable oil being decolorized,
(c) mixing the dissolved vegetable oil solution with a divalent or trivalent metallic cation dissolved in acetone,
(d) making the mixture basic with a suitable alkaline solution thereby producing a two-phase system,
(e) removing the lower phase—which contains most of the color bodies (pigment),
(f) filtering the upper phase, and
(g) removing the solvent from the filtered upper phase.

A preferred embodiment of the instant invention is indicated by the illustration provided in the example.

EXAMPLE

Cottonseed miscella was obtained from flaked, glanded cottonseed (*Gossypium hirsutum, L*) by extraction with a hexane-acetone-water azeotrope (HAW). Extractions of other portions with hexane have been made as well, details of which will be disclosed elsewhere. An estimate of the gossypol content in the miscella was made from the adsorbance at 360 m$\mu$ of the oil in spectrograde hexane, using the adsorptivity 334 liters gram$^{-1}$ cm.$^{-1}$ (ref. C. H. Boatner, Pigments of Cottonseed, Chapter VI of the book entitled Cottonseed, edited by A. E. Bailey, p. 258).

Solvent was removed from the miscella in vacuo and the oil was dissolved in hexane to a solution of 10% oil (v./v.). Ferric chloride dissolved in acetone was then added for a 1:1 molar ratio with gossypol. The amount of ferric chloride-acetone corresponded to 10% of the volume of oil-hexane. The addition caused dense formation of black, inky material. After a few hours, 1.5 volumes of 0.1 N NaOH were added to form an underlay into which much of the black precipitate and pigmented material entered. The upper, nonaqueous phase was passed through a layer of neutral, activated bleaching clay corresponding to approximately 1:1 (w./w.) clay to oil. Solvent was removed in vacuo and absorbence of light by the oil was determined. Control samples of oil were treated as above except ferric chloride was absent from the acetone.

We claim:
1. A method of decolorizing a color-fixed vegetable oil comprising:
  (a) dissolving the vegetable oil in hexane,
  (b) determining the approximate amount of pigment in the vegetable oil being decolorized,
  (c) mixing the dissolved vegetable oil solution with ferric chloride dissolved in acetone,
  (d) making the mixture basic with a sodium hydroxide solution thereby producing a two-phase system,
  (e) removing the lower phase—which contains most of the color bodies (pigment),
  (f) filtering the upper phase, and
  (g) removing the solvent from the filtered upper phase.

2. A method of removing phenolic pigments from a color-fixed cottonseed oil comprising:
  (a) preparing a volume to volume 10% cottonseed oil in hexane solution,
  (b) estimating the phenolic pigment content from absorbance at 360 m$\mu$ of the oil in spectrograde hexane, using the absorptivity 334 liters gram$^{-1}$ cm.$^{-1}$,
  (c) mixing 10 volumes of the dissolved cottonseed oil solution with one volume of ferric chloride-acetone solution containing a molar ratio of about 1:1 ferric chloride to phenolic pigments to produce a dense black cloud in the mixture,
  (d) adding to the mixture about 1.5 volumes of 0.1 N sodium hydroxide, stirring the new mixture until a two-phase system develops,
  (e) setting aside the bottom phase which contains most of the phenolic pigments,
  (f) passing the upper phase through neutral activated bleaching clay, the amount of clay to correspond approximately to about a 1:1 (w./w.) ratio with the oil, and
  (g) removing the solvent from the filtered upper phase.

References Cited

UNITED STATES PATENTS

| | | | |
|---|---|---|---|
| 3,025,314 | 3/1962 | King et al. | 260—412.4 |
| 378,113 | 2/1888 | Scollay | 260—425 |
| 632,148 | 8/1899 | Rosenblum | 260—425 |

LEWIS GOTTS, Primary Examiner

E. G. LOVE, Assistant Examiner